United States Patent [19]

Merritt et al.

[11] 4,063,896

[45] Dec. 20, 1977

[54] REMOVAL OF PHOSGENE IMPURITY FROM BORON TRICHLORIDE BY LASER RADIATION

[75] Inventors: James A. Merritt, Pulaski; Lawrence C. Robertson, Fayetteville, both of Tenn.

[73] Assignee: The United States of America as represented by the Secretary of the Army, Washington, D.C.

[21] Appl. No.: 754,304

[22] Filed: Dec. 27, 1976

[51] Int. Cl.$^2$ .............................................. B01J 1/10
[52] U.S. Cl. .......................... 23/254 R; 204/157.1 R; 204/DIG. 11
[58] Field of Search ............... 23/254 R; 204/157.1 R

[56] References Cited

PUBLICATIONS

T. A. Osial, Instruments & Control Systems, Oct. 1967, pp. 101-104.
Chem. Abstr. 75, 56720a (1971), Okabe et al.

Primary Examiner—Robert M. Reese
Attorney, Agent, or Firm—Nathan Edelberg; Robert P. Gibson; Jack W. Voight

[57] ABSTRACT

Phosgene, $COCl_2$, an impurity in $BCl_3$ is dissociated by $CO_2$ laser radiation that is passed through a stainless steel laser cell with NaCl windows on each end of the cell. The power level of a cw $CO_2$ multiline laser can be varied to accomplish the irradiation to effectively dissociate the $COCl_2$ into its dissociation products, substantially CO and $Cl_2$. The $BCl_3$, $v_3$ (956 cm$^{-1}$) fundamental is resonant with $CO_2$ ($P_{20}$) laser line and strongly absorbs this energy which is followed by an intramolecular V—V transfer of energy to the $COCl_2$ which results in its dissociation. The gaseous compound $C_2H_4$ having combination bands and overtones that match reasonably close to the energy levels of $COCl_2$ can also serve as a diluent for $COCl_2$ to effect transfer of energy for dissociation of $COCl_2$ by cw $CO_2$ laser radiation.

7 Claims, 6 Drawing Figures

REMOVAL OF PHOSGENE IMPURITY FROM BORON TRICHLORIDE BY LASER RADIATION

DEDICATORY CLAUSE

The invention described herein may be manufactured, used, and licensed by or for the Government for governmental purposes without the payment to us of any royalties thereon.

BACKGROUND OF THE INVENTION

Commercially available $BCl_3$ (boron trichloride) of the highest purity still contains up to 0.1 percent $COCl_2$ (phosgene) contaminant. This contaminant or impurity causes difficulties when $BCl_3$ is used in the electronics industry, as a catalyst in numerous ways such as in the production of styrene, as an additive for high energy fuels, in the refining of various refractory metals, etc. Removal of the impurity from $BCl_3$ by economical methods has to data proven unsuccessful.

Advantageous would be a method to remove phosgene from boron trichloride or to change the phosgene to dissociation products which do not interfere with boron trichloride for its particular function or whereby the dissociation products of phosgene can be easily separated by conventional methods if required for boron trichloride catalysis function.

Therefore, an object of this invention is to provide a method for the dissociation of phosgene in the presence of $BCl_3$ without loss of $BCl_3$ concentration.

Another object of this invention is to provide a method to purify $BCl_3$ from the contaminant phosgene with laser radiation.

A further object of this invention is to provide a method for dissociation of phosgene in $BCl_3$ with a cw $CO_2$ laser radiation whereby the fundamentals of $BCl_3$ are resonant with the laser radiation to effect energy transfer to $COCl_2$ and results in its dissociation.

Still a further object of this invention is to provide a method of dissociation of phosgene in the presence of $C_2H_4$ that has combination bands and overtones that match reasonably close to the fundamental energy of phosgene to effect efficient V—V transfer of laser energy responsible for the dissociation of phosgene.

SUMMARY OF THE INVENTION

The removal of $COCl_2$ impurity in $BCl_3$ is accomplished by using cw $CO_2$ laser radiation. Mixtures of $BCl_3$ and $COCl_2$ and mixtures of $C_2H_4$ and $COCl_2$ are irradiated by cw $CO_2$ multiline laser at a power level to achieve dissociation of $COCl_2$. $BCl_3$ and $C_2H_4$ are gaseous compounds which are involved in the energy transfer from laser radiation to $COCl_2$ to cause dissociation of the $COCl_2$.

The gases in admixture were metered into a stainless steel cell with NaCl windows on each end to achieve a predetermined pressure and subsequently exposed to cw $CO_2$ multiline laser radiation for a predetermined period of time to effect dissociation of $COCl_2$. The predetermined pressure is to ensure efficient irradiation by the power level of the laser employed. That is, the molecular concentration of the gas in the cell should be in consonance with the power level of the cw $CO_2$ multiline laser to achieve an efficient transfer of energy from the gases, either $C_2H_4$ or $BCl_3$, to $COCl_2$ to effect dissociation of the $COCl_2$. The spectra of the static products are then obtained with a spectrophotometer (e.g., Beckman IR5) to evaluate the experiment to ascertain that the $COCl_2$ has been dissociated and to ascertain any depletion of the $BCl_3$ or $C_2H_4$ concentration.

BRIEF DESCRIPTION OF THE DRAWING

The figures of the drawing are infrared spectra wherein the percent transmittance is shown on the ordinate and the wave number and wavelength are shown on the abscissa.

DESCRIPTION OF THE PREFERRED EMBODIMENTS

Figure 1:
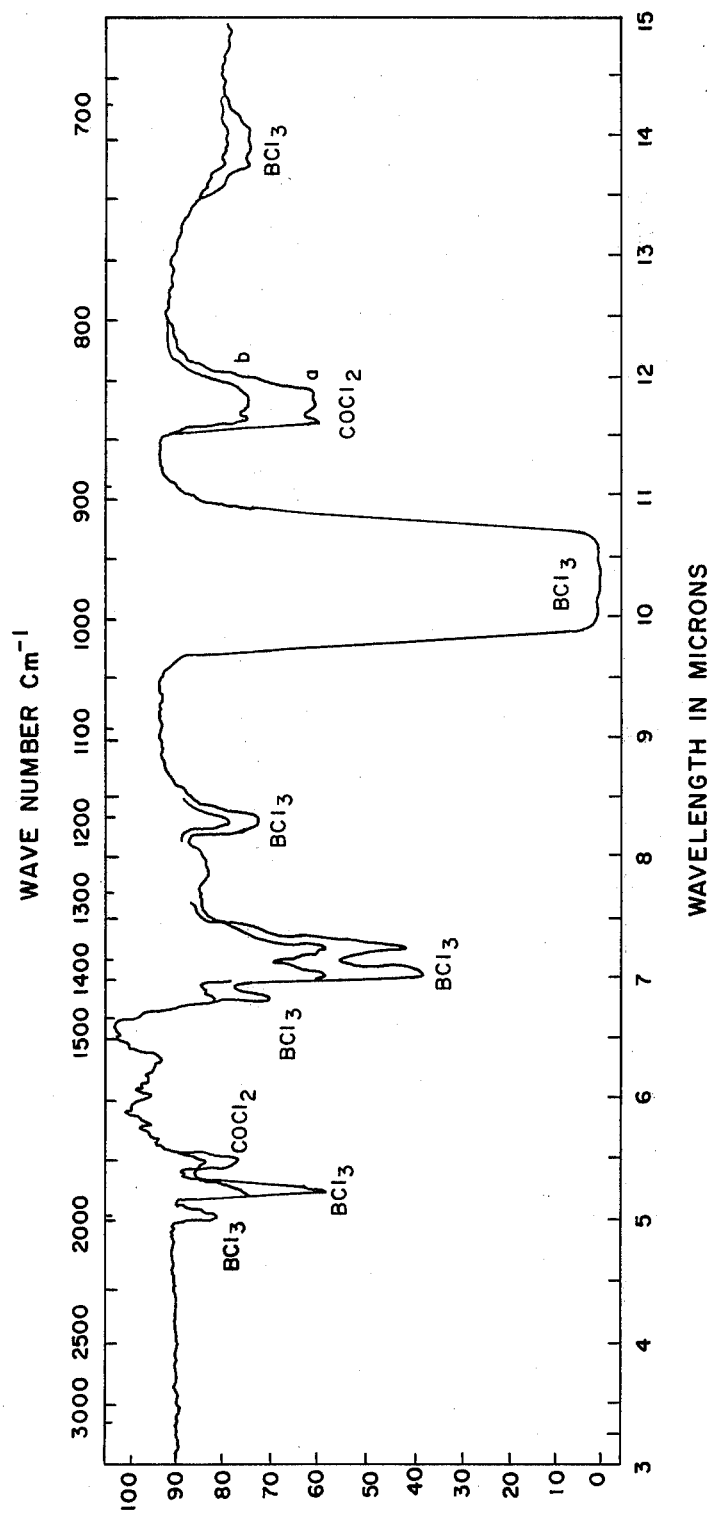
FIG. 1 is the spectra of $BCl_3$ at 50 and 100 torr pressure showing the $\nu_4$ (849 cm$^{-1}$) and $\nu_2$ (1827 cm$^{-1}$) bands of $COCl_2$ impurity.

The $BCl_3$ was obtained from Matheson Gas Products and had a stated impurity of 0.1% $COCl_2$ maximum. It was used without further attempts to purify it. The $H_2$ (hydrogen) was obtained from Silox Inc., and used without further purification as were the $COCl_2$ and $C_2H_4$ (ethylene) which were obtained from Matheson Gas Products.

The gases were metered into a laser cell (e.g., a 10 cm by 3 cm stainless steel cell with NaCl windows on each end) to provide a pressure in the range from about 5 torr to about 100 torr. Irradiation was accomplished with a cw $CO_2$ multiline laser at varying power levels. The unfocused beam was passed through the cell for a given period of time after which the spectra of the static products were obtained with a Beckman IR5 spectrophotometer.

The detailed description of the drawing includes the figure captions as related to the experimental procedures as follows:

FIG. 1. Spectra of $BCl_3$ (with the $COCl_2$ contaminant).
  a. 100 torr pressure.
  b. 50 torr pressure.

Figure 2:
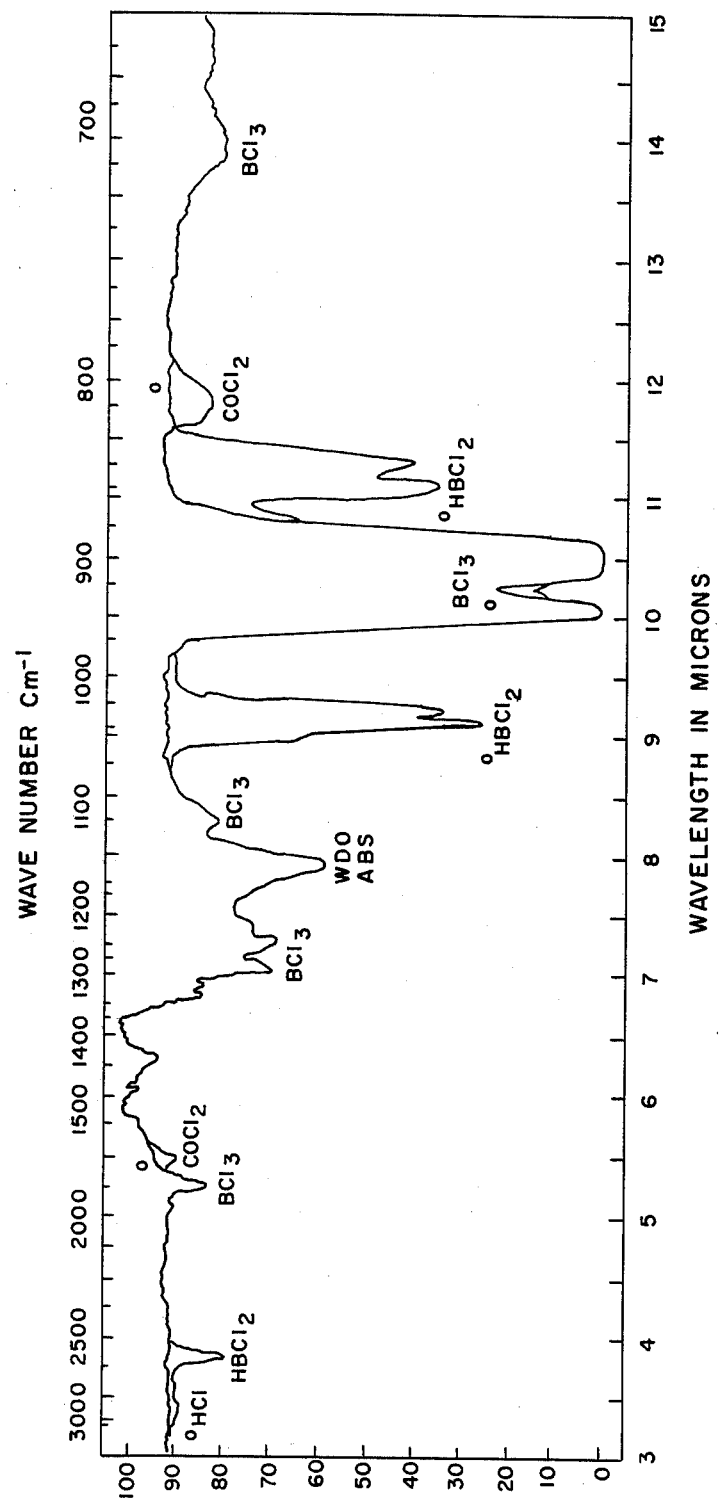
FIG. 2 is the spectra of the gases of FIG. 1 after being mixed with varying concentrations of $H_2$ and irradiated with cw $CO_2$ laser radiation.

FIG. 2. The spectrum of 25 torr pressure of $BCl_3$ (with the $COCl_2$ contaminant) and 25 torr pressure of $H_2$ before and after irradiation (O) for 2 sec with a 150 watt cw $CO_2$ laser. The term WDO ABS is window absorption.

Figure 3:
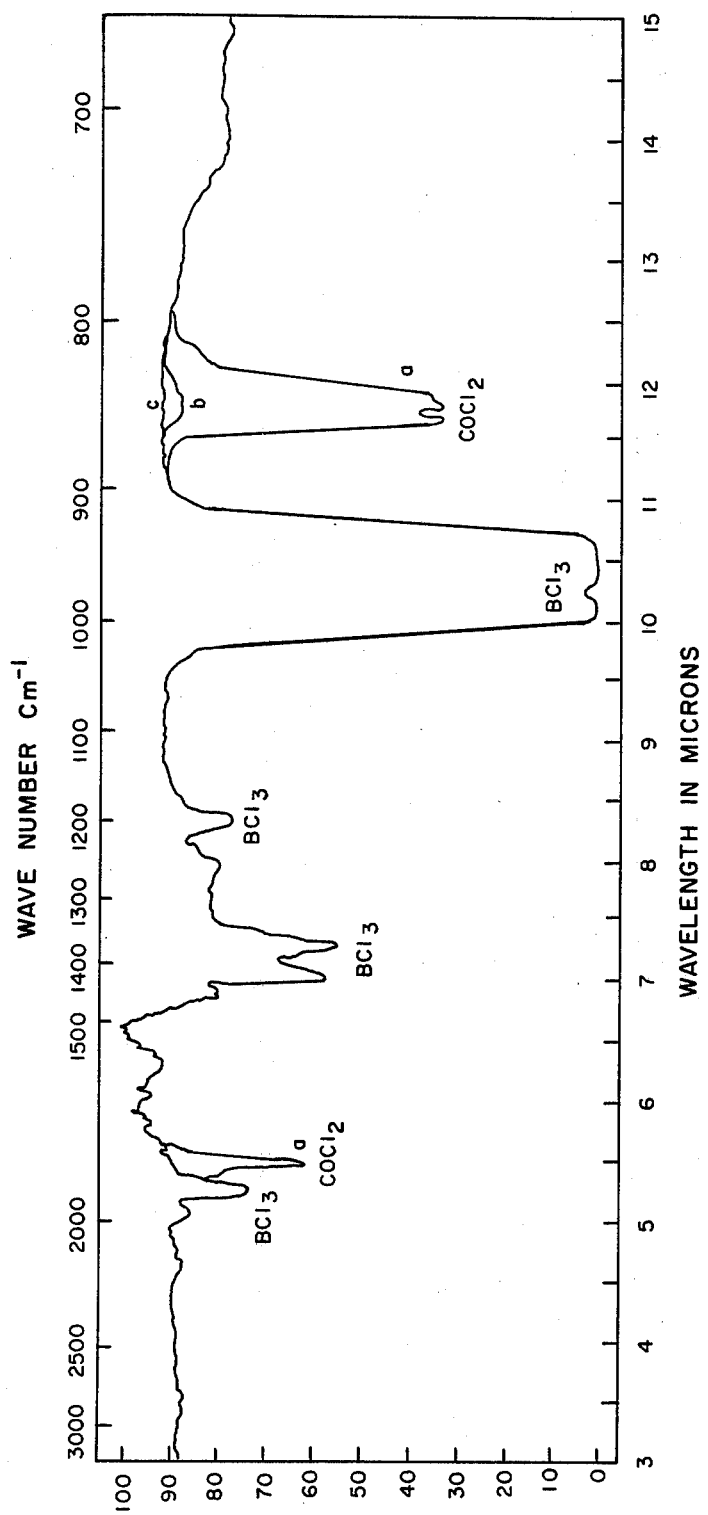
FIG. 3 is the spectra of a mixture of 50 torr pressure $BCl_3$ and 0.8 torr pressure $COCl_2$ after being irradiated with a 100 watt cw $CO_2$ multiline laser.

FIG. 3. Spectra of 50 torr pressure of $BCl_3$ and 0.8 torr pressure $COCl_2$.
  a. Before irradiation.
  b. After 3 sec irradiation time - 100 watts cw $CO_2$.
  c. Additional 1 sec irradiation time - 100 watts cw $CO_2$.

Figure 4:
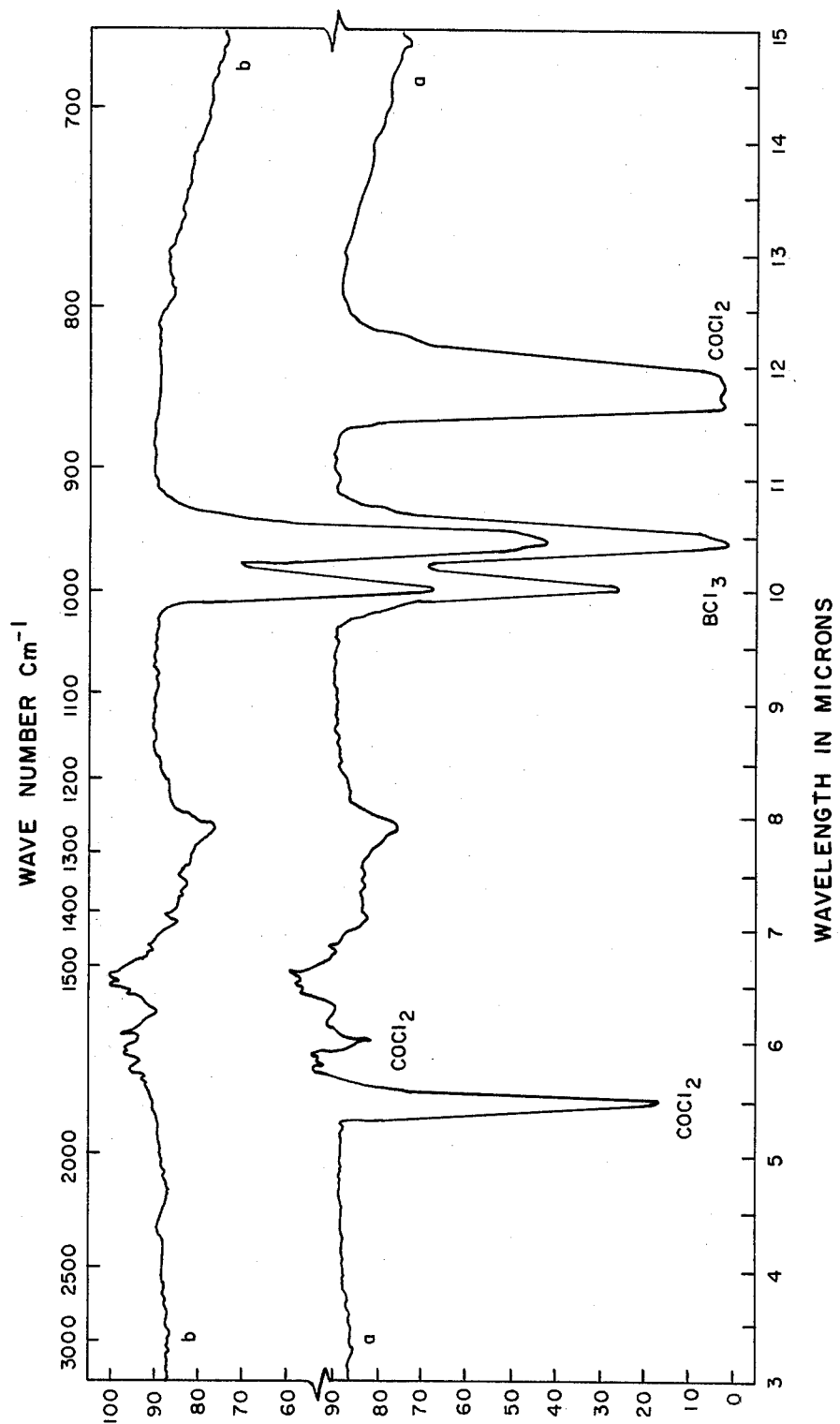
FIGS. 4 and 5 are spectra which further illustrate the destruction of $COCl_2$ in $BCl_3$ without loss of $BCl_3$ concentration, using a $CO_2$ laser and a few seconds irradiation time.

FIG. 4. Spectra of 6 torr pressure $BCl_3$ and 6 torr pressure $COCl_2$.
  a. Before irradiation.
  b. After irradiation with a 100 watt cw $CO_2$ laser for 15 sec.

Figure 5:
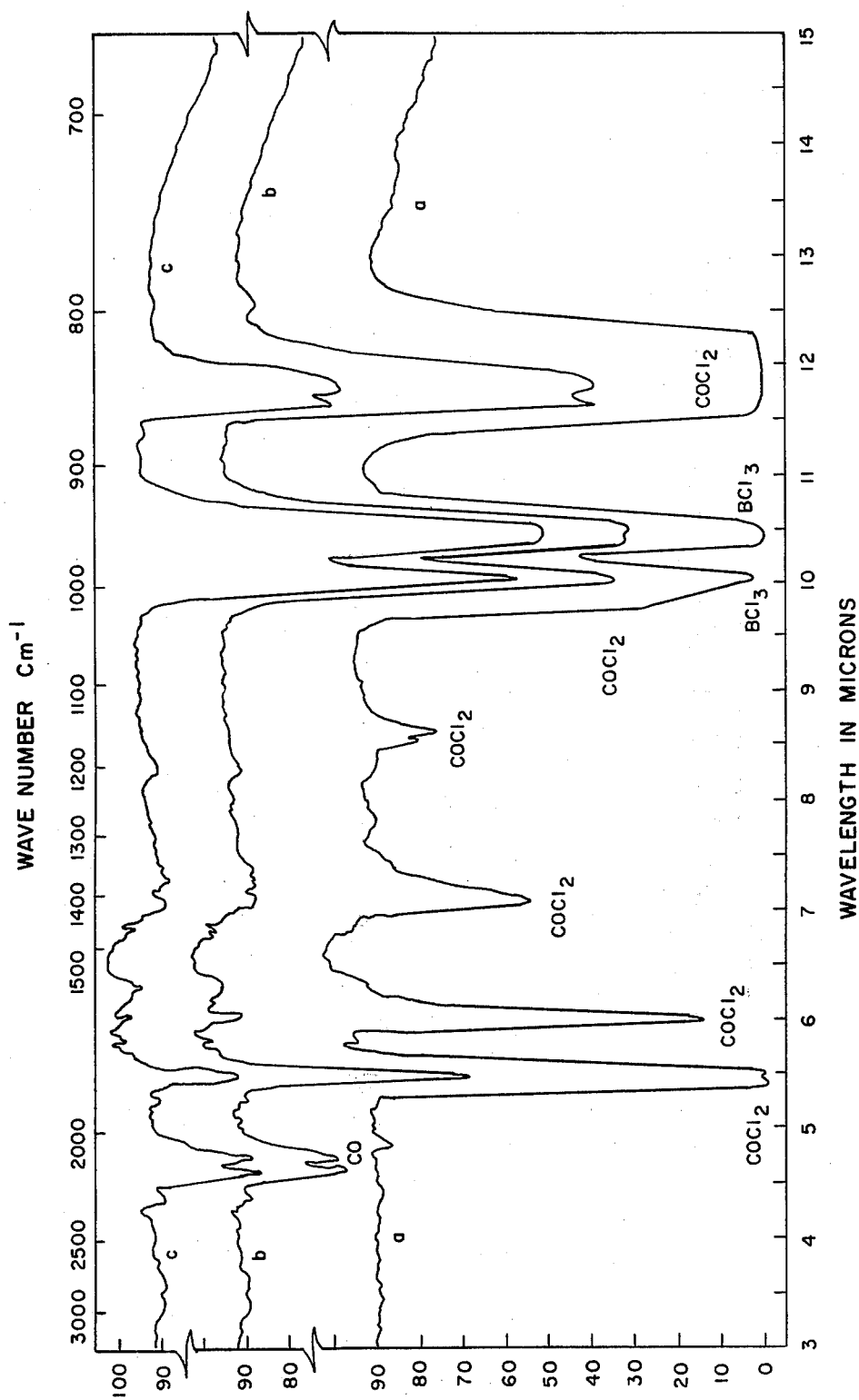

FIG. 5. Spectra of 10 torr pressure $BCl_3$ and 100 torr pressure $COCl_2$.
  a. Before irradiation.
  b. After irradiation with a 100 watt cw $CO_2$ laser for 15 sec.
  c. After an additional 20 irradiation time.

Figure 6:
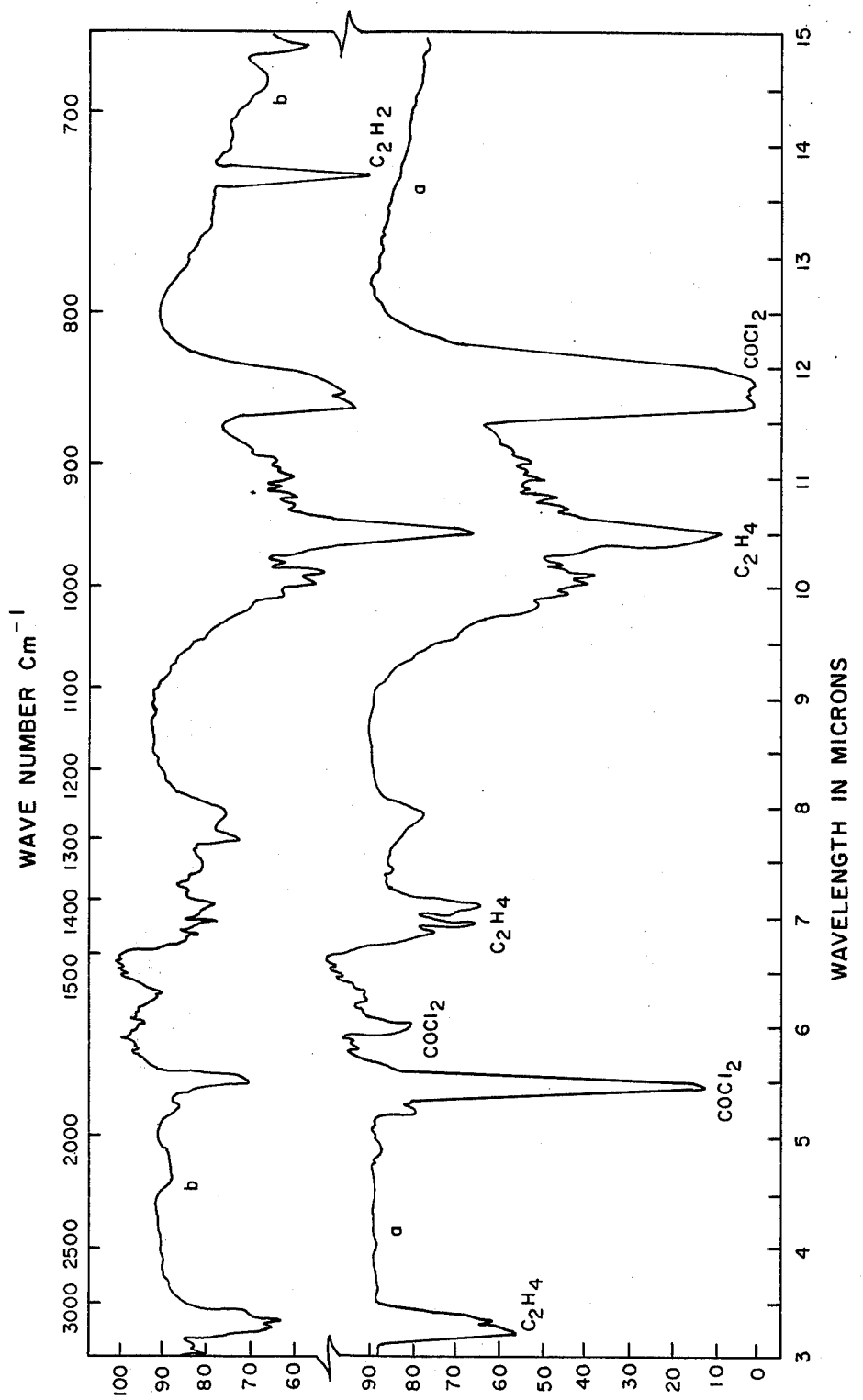
FIG. 6 is the spectra of a mixture of 6 torr pressure of $COCl_2$ and 50 torr pressure of $C_2H_4$. Curve *b* illustrates the destruction of $COCl_2$ but not as efficiently as when $BCl_3$ is used to transfer energy to $COCl_2$.

FIG. 6. Spectra of 50 torr pressure $C_2H_4$ and 6 torr pressure $COCl_2$.
  a. Before irradiation.
  b. After irradiation with a 100 watt cw $CO_2$ laser for 50 sec.

The irradiations of mixtures of $BCl_3$ and $COCl_2$ were accomplished with varying power levels of a cw $CO_2$ multiline laser; however, the data illustrated by the Figures are based on a power level of a 100 watt cw $CO_2$ multiline laser except as in FIG. 2 where the power level was at 150 watts.

FIG. 3 is the spectra of 50 torr pressure $BCl_3$ and 0.8 torr pressure $COCl_2$. After 3 sec irradiation time most of the $COCl_2$ has disappeared (as evidenced by reference curve b) and an additional 1 sec irradiation essentially removes all the $COCl_2$ from $BCl_3$ without an appreciable depletion of the $BCl_3$ concentration. FIGS. 4 and 5 are spectra which further illustrate the destruction of $COCl_2$ in $BCl_3$ without loss of $BCl_3$ concentration, using a cw $CO_2$ multiline laser and a few seconds irradiation time as noted hereinabove.

FIG. 5 (b and c) shows the appearance of the CO band at 2143 $cm^{-1}$. Also, the addition of $H_2$ to the cell after the irradiation resulted in large amounts of HCl being formed which indicates that $Cl_2$ was present. The CO band and the formation of large quantities of HCl on addition of $H_2$ indicates quite convincingly that the dissociation products of $COCl_2$ are CO and $Cl_2$.

The $BCl_3$, $\nu_3$ (956 $cm^{-1}$) fundamental is resonant with the $CO_2(P_{20})$ laser line and strongly absorbs this energy. The laser induced chemistry (LIC) reaction $BCl_3 + H_2 \rightarrow HBCl_2 + HCl$ (See FIG. 2) is based upon this resonant absorption by $\nu_3 (BCl_3)$. $COCl_2$ does not have a fundamental resonant with the $CO_2$ laser, consequently when pure $COCl_2$ was irradiated, there was no change in the $COCl_2$ concentration. This indicates that the $BCl_3$ is involved in the dissociation of the $COCl_2$. Thus, it is proposed that the $BCl_3$ absorbs energy from the $CO_2$ laser radiation, which is followed by an intramolecular V—V transfer of energy to the $COCl_2$ which results in its dissociation into CO and $Cl_2$. The $\nu_3$ (240 $cm^{-1}$) fundamental of $COCl_2$ and the $\nu_4$ (243 $cm^{-1}$) fundamental of $BCl_3$ are sufficiently close for efficient V—V transfer of energy.

If indeed the above mechanism is responsible for the dissociation of $COCl_2$, then one could confirm this with another molecule having a fundamental that is resonant with the $CO_2$ laser radiation and with a fundamental whose energy is close to that of one of the $COCl_2$ fundamentals.

FIG. 6 shows 6 torr of $COCl_2$ mixed with 50 torr of $C_2H_4$. The $\nu_{10}$ (995 $cm^{-1}$) fundamental of $C_2H_4$ is resonant with the $CO_2$ laser radiation and does absorb this energy. However, $C_2H_4$ has no fundamentals very close to the energy of the $COCl_2$ fundamentals but there are combination bands and overtones that match reasonably close. FIG. 6 (b) illustrates that the $COCl_2$ is being removed but not as efficiently as in the case where $BCl_3$ is used for the transfer of energy.

The experimental data from this work strongly suggests that laser radiation can be used to purify materials that have fundamentals that are resonant with the laser radiation, $BCl_3$ being a case in point, wherein efficient V—V transfer of energy takes place between the material being purified ($BCl_3$) and the contaminant ($COCl_2$).

As shown by examples, the contaminant $COCl_2$ is dissociated by laser radiation if a diluent is employed such as $C_2H_4$ which has combination bands and overtones that match reasonably close to the energy of the $COCl_2$ so that energy transfer takes place to effect dissociation. This technique of using a diluent could be advantageous if neat phosgene were desired to be dissociated as a means to dispose of the poisonous gas. This same technique may be applicable to other combinations of an undesirable and a diluent or a host material which contains a contaminant whereby the contaminant or undesirable compound can receive energy transfer from laser radiation via a gaseous diluent or host material to effect dissociation.

The disclosures of this invention indicate that the irradiation method could be adapted for continuous flow operation or for batch operations whereby the gaseous components in a container or cell are irradiated by laser energy to effect dissociation of the undesirable or contaminant compound.

Other diluent compounds or host compounds having fundamentals that are resonant with the laser radiation or having combination bands and overtones that match reasonably close to the energy of the $COCl_2$ could be selected for use with the method of this invention.

The primary object of this invention is to purify $BCl_3$ from $COCl_2$ contamination by laser irradiation to effect a dissociation of $COCl_2$. The invention method can be adjusted to use higher power laser irradiation for larger systems or as may be required for maximum energy utilization. If separation of the dissociation products are required for the end use of the $BCl_3$ then a separation step selected as modified from the prior art can be used in conjunction with this method.

We claim:
1. A method for dissociation of $COCl_2$ by laser irradiation of $COCl_2$ in presence of a gaseous compound selected from $BCl_3$ and $C_2H_4$, said selected gaseous compound when $BCl_3$ having a fundamental whose energy is close to that of one of the $COCl_2$ fundamentals and said selected gaseous compound when $C_2H_4$ having combination bands and overtones that match reasonably close to the energy of $COCl_2$ so that a transfer of energy takes place between said selected gaseous compounds and said $COCl_2$ when irradiated by laser radiation to effect dissociation of said $COCl_2$ when irradiated by laser radiation to effect dissociation of said $COCl_2$, said method comprising:
  i. metering said selected gaseous compound and said $COCl_2$ in admixture into a laser cell to achieve a predetermined pressure of said selected gaseous compound and said $COCl_2$ which comprise the gaseous components in said laser cell, said predetermined pressure to ensure consonance between the concentration of said gaseous components and the power level of a cw $CO_2$ multiline laser employed to irradiate said gaseous compound and said $COCl_2$ to effect dissociation of said $COCl_2$;
  ii. irradiating said selected gaseous compound and said $COCl_2$ in admixture by a cw $CO_2$ multiline laser at a predetermined power level of said cw $CO_2$ multiline laser for a predetermined time period to effect dissociation of said $COCl_2$; and,
  iii. obtaining a spectra of the static products of said admixture to detect said dissociation products of said $COCl_2$ and to determine when all the $COCl_2$ has been dissociated into dissociation products which are substantially CO and $Cl_2$ and said spectra to additionally detect any appreciable depletion of said selected gaseous compound.

2. The method of claim 1 wherein said selected gaseous compound is $BCl_3$ and said $COCl_2$ is present as a contaminant in an amount of about 0.1%, said predetermined pressure is in the range from about 50 torr to about 100 torr; said predetermined power level of said cw $CO_2$ multiline laser is about 100 watts; said predetermined time of irradiating is from about 3 seconds to about 4 seconds; and wherein said spectra detects that essentially all of said $COCl_2$ has been dissociated into said dissociation products and that no appreciable depletion of said $BCl_3$ concentration has taken place.

3. The method of claim 1 wherein said selected gaseous compound is $C_2H_4$ and said $COCl_2$ are mixed to form said admixture wherein said predetermined pressure of said $C_2H_4$ is about 50 torr; said predetermined pressure of said $COCl_2$ is about 6 torr; said predetermined power level of said cw $CO_2$ multiline laser is about 100 watts; and said predetermined time or irradiating is about 50 seconds.

4. The method of claim 1 wherein said selected gaseous compound is $BCl_3$ and said $COCl_2$ are mixed to form said admixture wherein said predetermined pressure of said $BCl_3$ varies from about 6 torr to about 50 torr and said $COCl_2$ varies from about 0.8 torr to about 100 torr; said predetermined power level of said cw $CO_2$ multiline laser is about 100 watts; said predetermined time of irradiating is from about 4 seconds to about 35 seconds; and wherein said spectra detects that essentially all of said $COCl_2$ has been dissociated into said dissociation products and that no appreciable depletion of said $BCl_3$ concentration has taken place.

5. The method of claim 4 wherein said predetermined pressure of said $BCl_3$ is about 50 torr, said predetermined pressure of said $COCl_2$ is about 0.8 torr; and said predetermined time of irradiating is about 4 seconds.

6. The method of claim 4 wherein said predetermined pressure of said $BCl_3$ is about 6 torr; said predetermined pressure of said $COCl_2$ is about 6 torr; and said predetermined time of irradiating is about 15 seconds.

7. The method of claim 4 wherein said predetermined pressure of said $BCl_3$ is about 10 torr; said predetermined pressure of said $COCl_2$ is about 100 torr; and said predetermined time of irradiating is about 35 seconds.

* * * * *